United States Patent
Cai et al.

(10) Patent No.: US 8,370,119 B2
(45) Date of Patent: *Feb. 5, 2013

(54) WEBSITE DESIGN PATTERN MODELING

(75) Inventors: Rui Cai, Beijing (CN); Jiang-Ming Yang, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 872 days.

This patent is subject to a terminal disclaimer.

(21) Appl. No.: 12/389,368

(22) Filed: Feb. 19, 2009

(65) Prior Publication Data

US 2010/0211927 A1  Aug. 19, 2010

(51) Int. Cl.
G06G 7/48 (2006.01)
(52) U.S. Cl. .......................................... 703/6
(58) Field of Classification Search .................. 703/6
See application file for complete search history.

(56) References Cited

U.S. PATENT DOCUMENTS

| | | | |
|---|---|---|---|
| 7,260,568 B2 | 8/2007 | Zhang et al. | |
| 7,599,931 B2 * | 10/2009 | Shi et al. .............................. | 1/1 |
| 7,853,596 B2 * | 12/2010 | Ma et al. ...................... | 707/741 |
| 8,051,083 B2 * | 11/2011 | Lai et al. ...................... | 707/737 |
| 2007/0073758 A1 | 3/2007 | Perry et al. | |
| 2007/0208703 A1 | 9/2007 | Shi et al. | |
| 2008/0010292 A1 | 1/2008 | Poola | |
| 2008/0104113 A1 | 5/2008 | Wong et al. | |
| 2008/0114800 A1 | 5/2008 | Gazen et al. | |

OTHER PUBLICATIONS

Crescenzi et al.; Clustering Web pages based on their structure; Data & Knowledge Engineering 54 (2005) 279-299.*

Zhao; academic class presentation referring to work of Chemudugunta; Nov. 1, 2007; pp. 1-29. Especially note section 2. (Modeling General and Specific Aspects of Documents with a Probabilistic Topic Model).*
Vidal et al.; Structure Driven Crawler Generation by Example; SIGIR '06, Aug. 6-1 L 2006, Seattle, Washington. USA.; pp. 292-299.*
Wei; Topic Models in Information Retrieval; PhD Thesis; Sep. 2007; pp. 1-146; UMI.*
Xu; Web Mining Techniques for Recommendation and Personalization; PhD Thesis; pp. 1-192; Mar. 2008; The School of Computer Science & Mathematics Faculty of Health, Engineering & Science Victoria University, Australia.*
Andrieu, C., N. de Freitas, A. Doucet, M. I. Jordan, An introduction to MCMC for machine learning, Machine Learning, Jan.-Feb. 2003, pp. 5-43, vol. 50, No. 1-2.
Bar-Yossef, Z., I. Keidar, U. Schonfeld, Do not crawl in the dust: Different urls with similar text, WWW 2007: 111-120 Proceedings of the 16th Int'l Conf. on World Wide Web, WWW2007, Banff, Alberta, Canada, May 8-12, 2007.

(Continued)

*Primary Examiner* — Hugh Jones
(74) *Attorney, Agent, or Firm* — Lyon & Harr, LLP; Richard T. Lyon (57) ABSTRACT

Website design pattern modeling technique embodiments are presented that model a website's design patterns. This can be based on the website's layout elements, its URL tokens, or both. When based on both, the design patterns can be modeled separately using first the layout elements and then the URL tokens, or vice versa. Alternately, the modeling can be based on coupled layout and URL token patterns. In operation, the modeling involves first identifying layout elements and/or URL tokens found on at least some of the pages of the website. The website design patterns are then modeled based on the occurrences of the identified layout elements and/or URL tokens in pages of the website. In cases where a coupled modeling scheme is employed, a modeling technique that exploits the correlations between the layout elements and URL tokens is used.

18 Claims, 7 Drawing Sheets

OTHER PUBLICATIONS

Cai, R., J.-M. Yang, W. Lai, Y. Wang, L. Zhang, iRobot: An intelligent crawler for web forums, Proc. of the 17th Int'l Conf. on World Wide Web, Apr. 21-25, 2008, pp. 447-456, Beijing, China.

Crescenzi, V., P. Merialdo, P. Missier, Fine-grain web site structure discovery, Fifth ACM CIKM Int'l Workshop on Web Info. and Data Management, Nov. 7-8, 2003, pp. 15-22.

Dhillon, I. S., Co-clustering documents and words using bipartite spectral graph partitioning, Proc. of the Seventh ACM SIGKDD Int'l Conf. on Knowledge Discovery and Data Mining, Aug. 26-29, 2001, pp. 269-274, San Francisco, CA, USA.

Dhillon, I. S., S. Mallela, D. S. Modha, Information-theoretic co-clustering, Proc. of the Ninth ACM SIGKDD Int'l Conf. on Knowledge Discovery and Data Mining, Aug. 24-27, 2003, pp. 89-98, Washington, DC, USA.

Jordan, M. I., Z. Ghahramani, T. Jaakkola, L. K. Saul, An introduction to variational methods for graphical models, Machine Learning, Nov. 1999, vol. 37, No. 2, pp. 183-233.

Lin, W.-L. Y.-Z. Liu, A novel website structure optimization model for more effective web navigation, Proc. of the Int'l Workshop on Knowledge Discovery and Data Mining, Jan. 2008, pp. 36-41, Adelaide, Australia.

Lin, S.-H., J.-M. Ho, Discovering informative content blocks from web documents, Proc. of the Eighth ACM SIGKDD Int'l Conf. on Knowledge Discovery and Data Mining, Jul. 2002, pp. 588-593, Edmonton, Alberta, Canada.

Poblete, B., R. A. Baeza-Yates, A content and structure website mining model, Proc. of the 15th Int'l Conf. on World Wide Web, May 2006, pp. 957-958, Edinburgh, Scotland, UK.

Wu, E. H., M. K. Ng, A graph-based optimization algorithm for website topology using interesting association rules, Advances in Knowledge Discovery and Data Mining, 7th Pacific-Asia Conference, Apr. 30-May 2, 2003, pp. 178-190, Seoul, Korea.

Zhu, J., Z. Nie, J.-R. Wen, B. Zhang, W.Y. Ma, 2D conditional random fields for web information extraction, Proc. of the Twenty-Second Int'l Conf., Aug. 2005, pp. 1044-1051, Bonn, Germany.

Blei, D. M., A. Y. Ng, M. I. Jordan, Latent Dirichlet allocation, J. of Machine Learning Research, Jan. 2003, pp. 993-1022, vol. 3.

Cai, D., S. Yu, J.-R. Wen, W.-Y. Ma, Block-based web search, Proc. of the 27th Annual Int'l ACM SIGIR Conf. on Research and Development in Information Retrieval, Jul. 25-29, 2004, pp. 456-463, Sheffield, UK.

Chemudugunta, C., P. Smyth, M. Steyvers, Modeling general and specific aspects of documents with a probabilistic topic model, Proc. of the Twentieth Annual Conf. on Neural Information Processing Systems, Vancouver, British Columbia, Canada, Dec. 4-7, 2006, pp. 241-248.

Dasgupta, A., R. Kumar, A. Sasturkar, De-duping URLs via rewrite rules, Proc. of the 14th ACM SIGKDD Int'l Conf. on Knowledge Discovery and Data Mining, Aug. 24-27, 2008, pp. 186-194, Las Vegas, Nevada, USA.

Developer Shed, Website pattern extractor, retrieved from http://tools.devshed.com/webmaster-tools/regex-pattern-extractor/, Dec. 12, 2008, pp. 1-2.

Hofmann, T., Latent semantic models for collaborative filtering, J. ACM Transactions on Info. Sys., vol. 22, No. 1., Jan. 2004, ACM New York, NY, USA, pp. 89-115.

Iconico, Data extractor, http://www.iconico.com/DataExtractor/, Dec. 15, 2008, pp. 1-2.

Landay, J., Web design process & patterns, retrieved from hccedl.cc.gatech.edu/getDocument.php?doc=166, Jan. 27, 2002, pp. 1-42.

Otto, O., D. Hong, T. Dennis, Designing and testing an interface for the U.C. Berkeley web design pattern library, retrieved from http://74.125.77.132/search?q=cache:VOidiG0n7WAJ:www.ui-designpatterns.org/tr/usertesting.pdf, Dec. 15, 2008, pp. 1-32.

Simic, H., Modeling web site structure in UriGraph, The Twelfth Int'l World Wide Web Conf. Proc., May 2003, pp. 1-2, Budapest, Hungary.

Song, R., H. Liu, J.-R. Wen, W.-Y. Ma, Learning block importance models for web pages, Proc. of the 13th Int'l Conf. on World Wide Web, May 2004, pp. 203-211, New York, NY, USA.

Xing, E. P., R. Yan, A. G. Hauptmann, Mining associated text and images with dual-wing harmoniums, Proc. of the 21st Conf. in Uncertainty in Artificial Intelligence, Jul. 26-29, 2005, pp. 633-641, Edinburgh, Scotland.

* cited by examiner

WEBSITE DESIGN PATTERN MODELING

BACKGROUND

To facilitate a user's understanding and browsing of a website, designers carefully select hypertext markup language (HTML) elements and define Uniform Resource Locators (URLs). Designers also typically make the style of both page layouts and URLs consistent over the entire site. Almost every website on the Internet has a distinct design style, which is meant to impress visitors and to provide a convenient user experience.

To create a style for a website, experienced designers usually create distinguishable layout templates for pages with different functions. For each layout, according to the function of the corresponding pages, designers will select HTML elements (e.g., link, button, input box, and so on) to construct functional blocks like navigation tabs and search pagination. These functional blocks are then placed at an appropriate location on a page. In addition, designers also define URLs with clear semantics and regular formats to distinguish different pages in a website. The designing characteristics of both the page layouts and URLs can be referred to as the design patterns of a website.

SUMMARY

This Summary is provided to introduce a selection of concepts, in a simplified form, that are further described below in the Detailed Description. The Summary is not intended to identify key features or essential features of the claimed subject matter, nor is it intended to be used as an aid in determining the scope of the claimed subject matter.

Website design pattern modeling technique embodiments described herein generally involve modeling a multi-page website's design patterns. In one embodiment, this modeling is based on the website's layout elements, and optionally on URL tokens. The modeling begins with the identification of some or all of the pages of a website. For each of the identified pages, the layout elements are identified and added to a vocabulary list of layout elements. When all the identified pages have been processed, a model of the website design patterns is constructed based on the occurrences of the listed layout elements in pages of the website. If the website's URL tokens are also to be used to independently model the design patterns of the website, then these tokens are then identified and added to a vocabulary list of URL tokens. This is done on a page-by page basis either at the same time as the identification and vocabulary list building associated with the layout elements, or after the layout element processing is complete. Once all the identified pages have been processed for the URL tokens, a model of the website design patterns is constructed based on the occurrences of the listed tokens in pages of the website.

It is noted that in other embodiments the modeling of a website's design patterns can be based solely on its URL tokens.

Alternately, given that the URL tokens and page layouts in a website are often correlated, it is also envisioned that the website design patterns can be modeled using coupled layout and URL token patterns. In embodiments employing a coupled modeling scheme, some or all of the pages of the website are identified, just as they were in the previously-described embodiments. For each of the identified pages, the layout elements are identified and added to a vocabulary list of layout elements. Similarly, URL tokens are identified and added to a vocabulary list of URL tokens. When all the identified pages have been processed, a model of the website design patterns is constructed based on the occurrences of listed layout elements and URL tokens in the pages of the website. The foregoing modeling is accomplished using a coupled modeling technique that exploits the correlations between the layout elements and URL tokens.

DESCRIPTION OF THE DRAWINGS

The specific features, aspects, and advantages of the disclosure will become better understood with regard to the following description, appended claims, and accompanying drawings where:

DETAILED DESCRIPTION

In the following description of website design pattern modeling technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Website Design Pattern Modeling

In general, the website design pattern modeling technique embodiments described herein are directed toward automatically discovering the design patterns of a website. The discovered patterns can then be used for a variety of purposes. For example, knowing website design patterns allows for improved performance of web page clustering. Understanding the design patterns of a website is also useful for applications such as web crawling, data extraction, information retrieval. For crawling, layout patterns can help identify valuable out-links on a page, while URL patterns can help detect duplicate pages and remove redundant content in crawling. For data extraction, layout patterns can be utilized to group pages with similar templates and to build proper wrappers.

For information retrieval, layout patterns can be used to aid in the discovery of informative blocks in web pages.

The ability to discover the design patterns of a website can be based on the generative process a designer goes through to create a site. In the planning stage, designers first decide how many kinds of web pages are required in the website being created, as well as what functions each page type should provide. Then, designers figure out what fundamental patterns, for either pages or URLs, are needed to support those functions. Such a planning stage is actually a top-down process; while in the implementation stage, the process is in an opposite manner, i.e., a bottom-up process which can be divided into the following steps.

First, designers construct a series of design patterns for both page layouts and URLs. These patterns are made up of basic components including URL tokens and HTML elements. For example, to build a layout pattern of "rating an object", designers might adopt HTML elements like <img> to show voting stars and <select><option> to support submitting new scores. Also, designers might create URL patterns like "showresult?sortby=score" using three basic tokens "showresult", "sortby", and "score". In general, each layout pattern implements a special function and each URL pattern exhibits a descriptive semantic.

Second, according to the function of a given page, designers put corresponding layout patterns at appropriate locations on the page, and also embed related URL patterns in its link address. For example, a page showing customer reviews might contain layout patterns such as "rating an object" and "adding new comments". Finally, to help users navigate in the website, designers add links to connect pages of different functions to construct a graph structure.

In view of the foregoing generative process it can be seen that a website's design pattern can be characterized in terms of its layout and URL patterns.

1.1 Definitions

Before presenting a description of website design pattern modeling technique embodiments, it will be useful to first explain some of the terms and concepts involved. These include the definition of a layout element, URL token, layout pattern, URL pattern and a coupled pattern.

1.1.1 Layout Element

Figure 1:
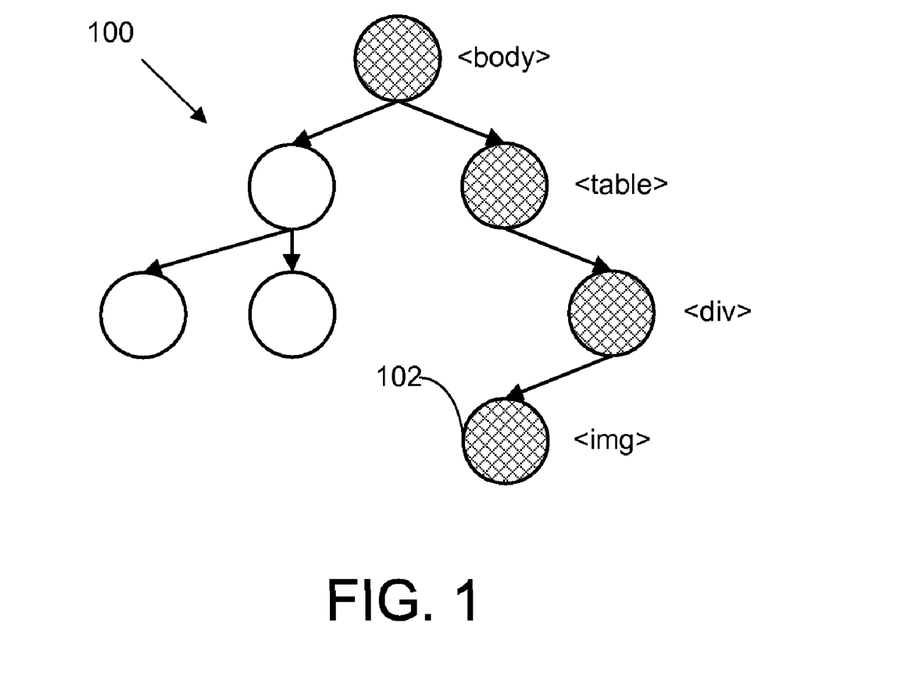
FIG. 1 is a diagram depicting a Document Object Model (DOM) tree exemplifying the HTML layout element tag string "<body><table><div>+<img>.

In one implementation, a layout element is defined as a combination of an HTML element and its location on the corresponding web page. The HTML element is just the element's tag name and not any of its attributes. In this scheme, two HTML elements with same tag name, but different locations, are considered as two different layout elements. This is intuitive. For example, given two buttons, one on the top and the other on the bottom of a page, it is very likely each button has a totally different purpose in the page design. Thus, each button element is distinguished in modeling the design patterns. The location of an HTML element is described by its path on a Document Object Model (DOM) tree, which is actually the concatenation of the tag names of its parent nodes. For example, referring to FIG. 1, the <img> node 102 on the DOM tree 100 is represented by the tag string "<body><table><div>+<img>", where "<body><table><div>" is the path and <img> is the HTML element.

1.1.2 URL Token

Figure 2:
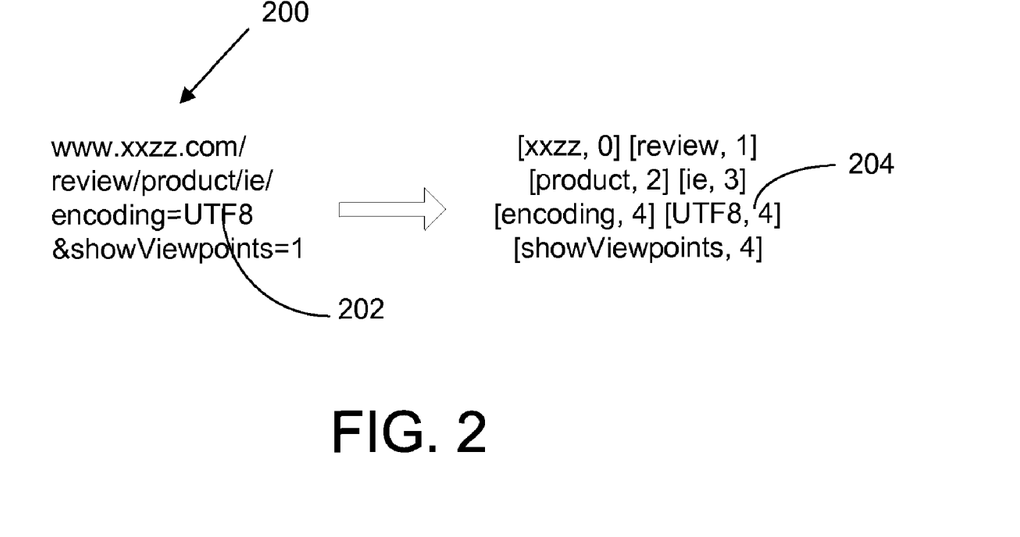
FIG. 2 is a diagram depicting an exemplary URL having substrings and a URL token representation of the URL based on the numbered positions of its substrings.

In one implementation, a URL token is defined as a combination of a substring and its position in a URL. A URL string can be divided into hierarchical components separated by a "/" symbol, and each component can be further split into substrings using reserved characters such as "?", "&", "=", ":", and so on. To assign a position in the URL, the URL components are numbered in sequence (e.g., component number=0, 1, 2, . . . ) and the resulting number assigned to each component. It is noted that each substring within a component is assigned the same component number. Thus, for example, referring to FIG. 2, the substring "UTF8" 202 in component number 4 of the URL 200 shown is represented by the URL token "[UTF8, 4]" 204.

1.1.3 Layout Pattern

In one implementation, a layout pattern $z_e$ is defined as a distribution over the vocabulary of all the layout elements in a website. Given this, $P(e_i|z_e)$, $1 \leq i \leq V_e$ where $e_i$ is the $i^{th}$ layout element in the vocabulary and $V_e$ is the layout vocabulary length.

1.1.4 URL Pattern

In one implementation, a URL pattern $z_u$ is defined as a distribution over the vocabulary of all the URL tokens in a website. Given this, $P(u_j|z_u)$, $1 \leq j \leq V_u$ where $u_j$ is the $j^{th}$ token in the vocabulary and $V_u$ is the URL vocabulary length.

1.1.5 Coupled Pattern

In one implementation, a coupled pattern $z_{all}$ is defined as a joint distribution over the vocabularies of both layout elements and URL tokens in a website. Given this, $P(e_i,u_j|z_{all})$, $1 \leq i \leq V_e$ and $1 \leq j \leq V_u$. This joint distribution characterizes the relationships among different layout elements and URL tokens in the website.

1.2 Website Design Pattern Modeling Process

Figure 3:
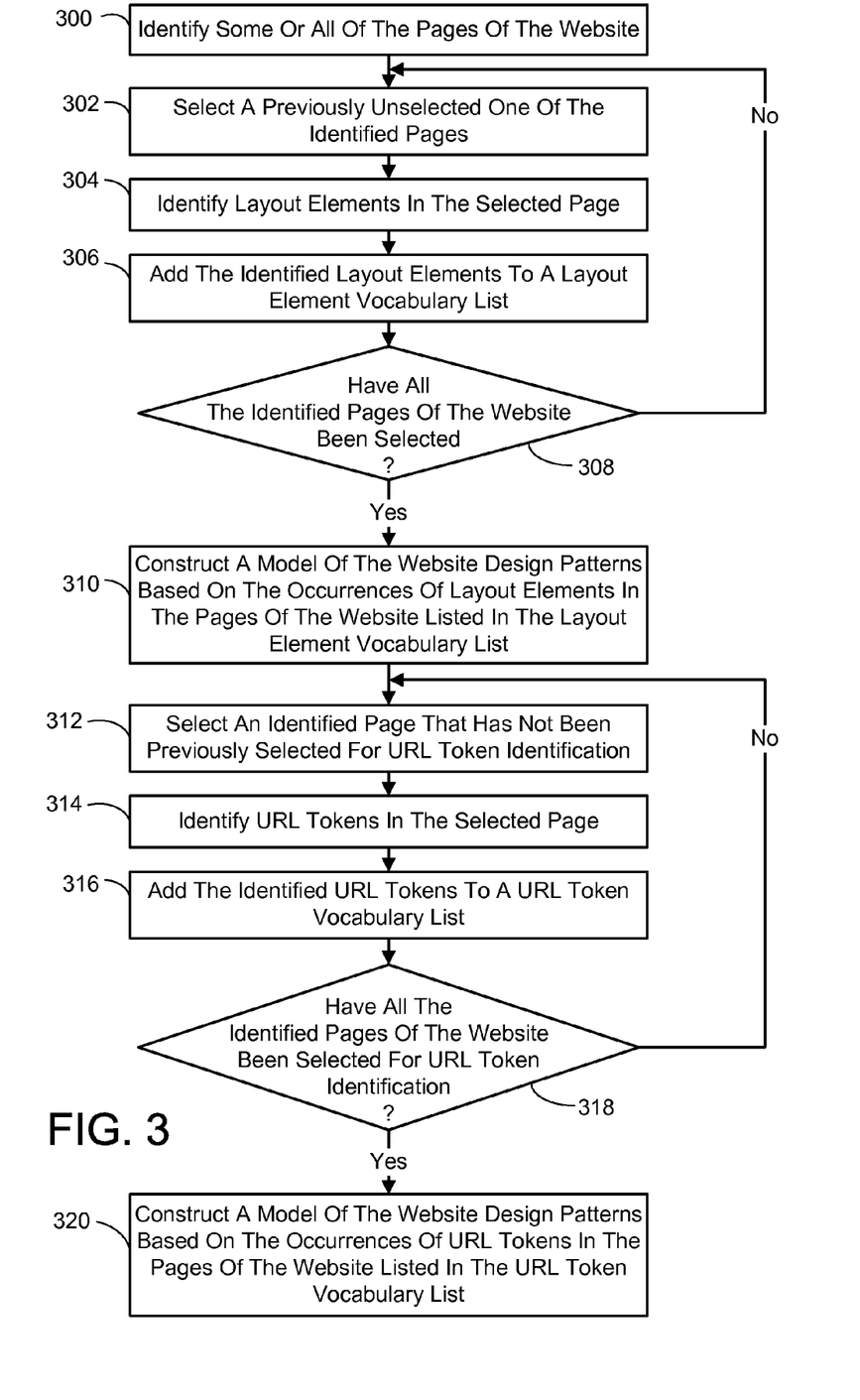
FIG. 3 depicts a flow diagram generally outlining one embodiment of a process for modeling a website's design patterns based on its layout elements and optionally its URL tokens.

In one embodiment, the modeling a website's design patterns is based on its layout elements, and optionally its URL tokens. Referring to FIG. 3, an exemplary process for accomplishing this modeling is shown. The process begins by identifying some or all of the pages of the website for analysis (300). For example, to reduce the processing costs, a number of pages from a large website can be chosen for analysis, rather than all the pages. Any existing method for choosing the pages to be analyzed can be adopted. For instance, the identification can be random, or a more structured approach could be employed. A previously unselected one of the identified pages is then selected (302). Layout elements are identified in the selected page (304) and added to a vocabulary list of layout elements (306). Standard sampling methods can be employed to extract and identify the layout elements from the selected website page. It is next determined if all the identified pages of the website under analysis have been selected (308). If not, actions 302 through 308 are repeated. When all the identified pages have been selected and processed, a model of the website design patterns is constructed based on the occurrences of layout elements in the pages of the website that are listed in the layout element vocabulary list (310).

If just the layout elements are to be used to model the website design patterns, then the process ends. However, if the URL tokens are also used to independently model the design patterns of the website, then the following actions are also performed. A previously unselected one of the identified pages is selected (312). URL tokens are then identified in the selected page (314) and added to a vocabulary list of URL tokens (316). Again, standard sampling methods can be employed to extract and identify the URL tokens from the selected website page. It is next determined if all the identified pages of the website under analysis have been selected for the purpose of identifying URL tokens (318). If not, actions 312 through 318 are repeated. When all the identified pages have been selected and processed, a model of the website design patterns is constructed based on the occurrences of URL tokens in the pages of the website that are listed in the URL token vocabulary list (320).

It is noted that while the page selection, identifying and vocabulary list building actions are performed separately for the layout elements and URL tokens in the foregoing exemplary embodiment of the modeling process, this need not be the case. Instead, each identified page could be selected once, and the respective identifying and vocabulary list building steps for the layout elements and URL tokens can be performed in series, before moving on to the next page. It is also noted that instead of modeling a website's design patterns based on its layout elements, and optionally its URL tokens, in one embodiment the modeling can instead be based just on the URL tokens.

In view of the foregoing process and its variations, it is evident that it is possible to model layout patterns and/or URL patterns of a website separately, and then use these models as representative of the website design patterns. However, alternately, given that the URLs and page layouts in a website have close relationships as shown previously in the description of a website designer's generative process, it is possible that the website design patterns might be modeled using coupled layout and URL token patterns.

Figure 4:
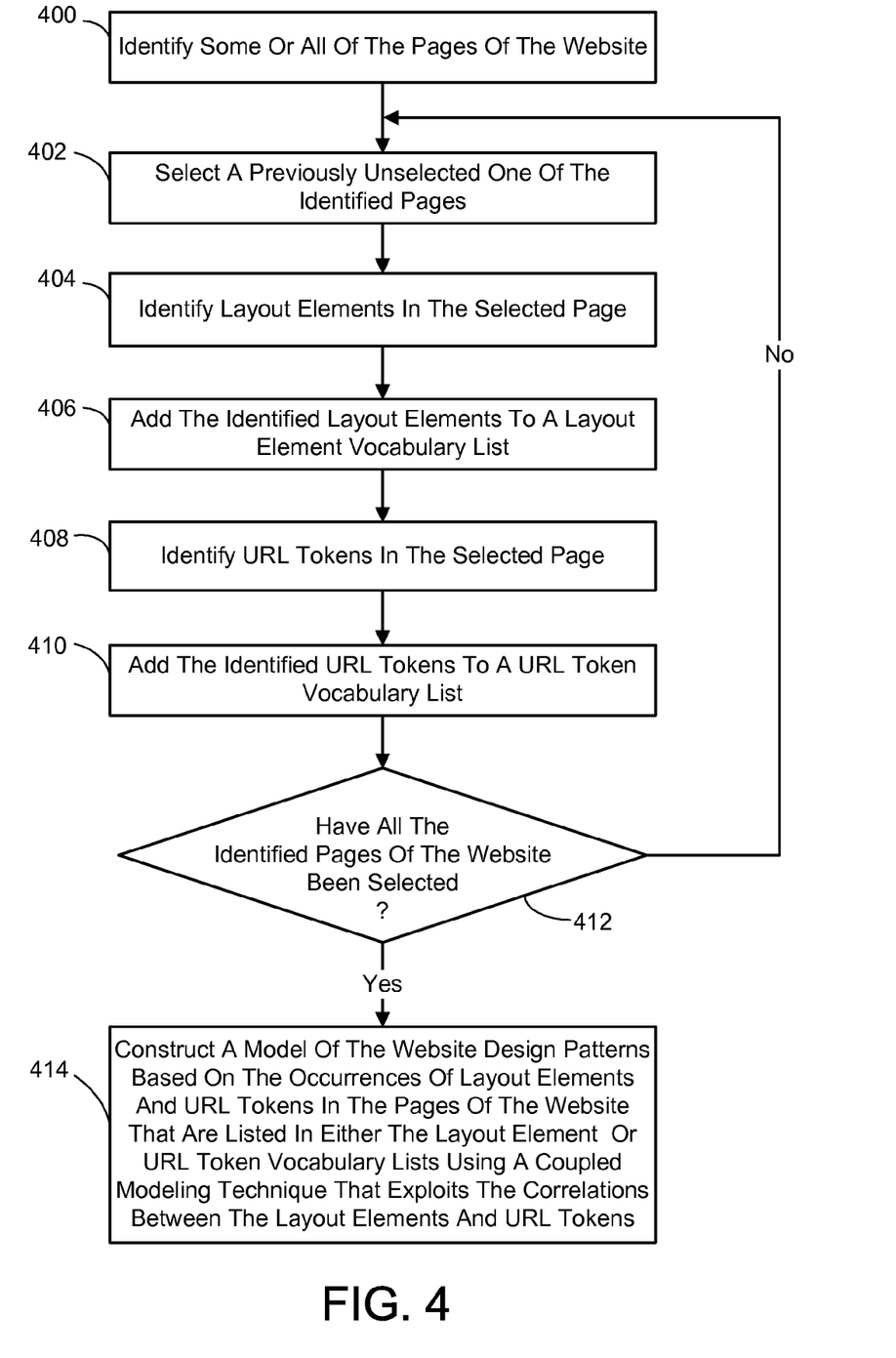
FIG. 4 depicts a flow diagram generally outlining one embodiment of a process for modeling a website's design patterns based on a coupling of its layout element and URL token patterns.

Referring to FIG. 4, one embodiment of a coupled modeling scheme involves first identifying some or all of the pages of the website for analysis (400). A previously unselected one of the identified pages is then selected (402). Layout elements are then identified in the selected page (404) and added to a vocabulary list of layout elements (406). Similarly, URL tokens are identified in the selected page (408) and added to a vocabulary list of URL tokens (410). It is next determined if all the identified pages of the website under analysis have been selected (412). If not, actions 402 through 412 are repeated. When all the identified pages have been selected and processed, a model of the website design patterns is constructed based on the occurrences of layout elements and URL tokens in the pages of the website that are listed in either the layout element or URL token vocabulary lists (414), and the process ends. The foregoing modeling action 414 is accomplished using a coupled modeling technique that exploits the correlations between the layout elements and URL tokens. Exemplary coupled modeling techniques (as well as single model techniques) will be described in more detail in the sections to follow.

1.3 Pattern Modeling Techniques

Various modeling techniques can be employed to characterize a website's design patterns from a vocabulary list of its layout elements and URL tokens, whether it be separately or using coupled models. One choice is to employ probabilistic graphical models. A graphical model represents the dependencies among random variables by a graph in which each node is a random variable, and the edges between the nodes represent conditional dependencies. In most applications, latent variables in a graphical model are utilized to represent some latent semantic topics. This is why the corresponding models are also often called topic models. Graphical models have the advantages of embedding human knowledge in constructing the graph topology, and discovering latent topics in an unsupervised way. Moreover, for graphical models there are also well-developed approximation techniques for learning and inference, such as variational inference and Gibbs sampling.

The following sections will describe embodiments using probabilistic graphical models to model website design patterns. First, three different single probabilistic graphical models will be described that handle one kind of observable input. It will also be explained why these single models are capable of modeling either layout or URL patterns. The three models to be described are the Latent Dirichlet Allocation (LDA) model, the Special Word (SW) model and the Special Word with Background (SWB) model. These three single models are then extended to produce three corresponding coupled models, each of which is able to handle two observable inputs. The coupled models will be referred to as coupled-LDA, coupled-SW and coupled-SWB. It will then be explained why the coupled models are capable of modeling the correlations between the layout and URL patterns.

1.3.1 Single Models for Layout and URL Patterns

The three aforementioned single models (LDA, SW and SWB) are discussed in this section. As will be seen, these three models have the same generative structure; with LDA being a special case of SW, and SW being a special case of SWB. In the following description, diagrams representing each of the probabilistic graphical models will be referenced (see FIGS. 5-7). In these diagrams, graph nodes represent random variables and the boxes denote "plates" representing replicates of variables. The crosshatched nodes refer to observed values, while the nodes without crosshatching denote hidden variables. It is noted that this same scheme will be employed in diagrams to represent coupled models in subsequent sections of this description.

1.3.1.1 The Latent Dirichlet Allocation (LDA) Model

In the LDA model, a web page d consists of a collection of $N_d$ observation items $\{o_1, o_2, \ldots, o_i, \ldots, o_{N_d}\}$, in which $o_i$ represents an element in layout pattern modeling or a token in URL pattern modeling. There are a total of D pages in the corpus and T latent topics in the model. Simulating the behaviors of website designers, as shown in one embodiment depicted in FIG. 5, in LDA a page d is assumed to be generated through first drawing a mixture of patterns θ (node 500) from a Dirichlet distribution with parameter α: θ~Dir(α) (node 502). Then, for each observation item $o_i$ (node 504) in d, a pattern $z_i$ (node 506) is drawn from a multinomial distribution with parameter θ: $z_i$~Mult(θ), and $o_i$ is drawn from a multinomial distribution with parameter $\phi_{z_i}$: $o_i$~Mult($\phi_{z_i}$), where $\phi_{z_i}$~Dir(β) (node 508) and β (node 510) is the hyperparameter controlling the distribution of $\phi_{z_i}$.

Figure 5:
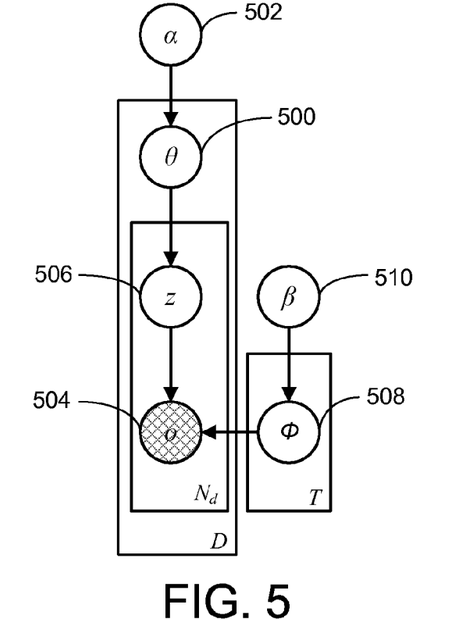
FIG. 5 is a diagram depicting a LDA probabilistic graphical modeling approach.

In LDA, the conditional probability of an observation item $o_i$ given a page d can be written as:

$$p(o_i \mid d) = \sum_{t=1}^{T} p(o_i \mid z_i = t)p(z_i = t \mid d) = \sum_{t=1}^{T} \phi_{t,o_i} \theta_t \quad (1)$$

In this way, each item in a page is assumed to be generated by some pattern.

1.3.1.2 The Special Word (SW) Model

The SW model extends LDA by introducing the concept of a "document-specific-word". In the SW model, each observable item in a page can be generated not only by global functional patterns but also by a page-specific local distribution. This makes sense because in website design there are indeed some special items which are just created to implement some special functions for some individual pages. In LDA these special items are absorbed in the global patterns, even though they do not exist globally across the website.

Figure 6:
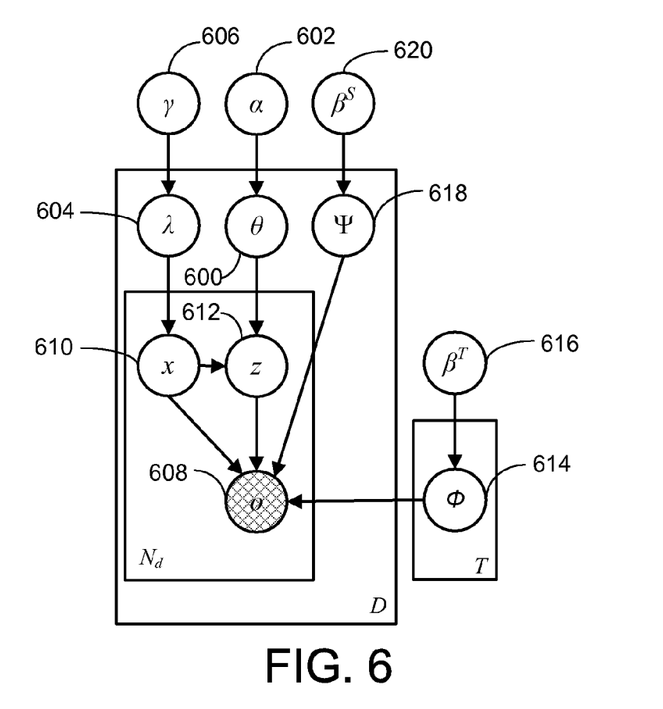
FIG. 6 is a diagram depicting a SW probabilistic graphical modeling approach.

To model the page-specific information, in the SW model, for each page d a multinomial distribution Ψ called the page-specific pattern is added. In addition, a binary switch x(x∈{0, 1}) is added for each item $o_i$. As shown in FIG. 6, in the embodiment of the SW model illustrated, a page d is generated through first drawing a mixture of patterns θ (node 600) from a Dirichlet distribution with parameter α: θ~Dir(α) (node 602). A mixture of switches λ (node 604) is then drawn from a Dirichlet distribution with parameter γ: λ~Dir(γ) (node 606). Next, for each observation item $o_i$ (node 608) in d, a switch value $x_i$ (node 610) is drawn from a multinomial distribution with parameter λ: $x_i$~Mult(λ). If $x_i$=0, a design pattern $z_i$ (node 612) is drawn from a multinomial distribution with parameter θ: $z_i$~Mult(θ); and then $o_i$ is drawn from a multinomial distribution with parameter $\phi_{z_i}$: $o_i$~Mult($\phi_{z_i}$), where $\phi_{z_i}$~Dir($\beta^T$)(node 614) and $\beta^T$ (node 616) is the hyper-parameter controlling the distribution of $\phi_{z_i}$. Whereas, if $x_i$=1, $o_i$ is drawn from the page-specific pattern Ψ: $o_i$~Mult(Ψ), where Ψ~Dir($\beta^S$) (node 618) and $\beta^S$ (node 620) is the hyper-parameter controlling the distribution of Ψ.

In the SW model, the conditional probability of an observation item $o_i$ given a page d can be written as:

$$p(o_i \mid d) = \qquad (2)$$
$$p(x=0 \mid d) \sum_{t=1}^{T} p(o_i \mid z_i = t) p(z_i = t \mid d) + p(x=1 \mid d) p'(o_i \mid d)$$

where $p'(o_i|d) = \Psi_{o_i}$. In this way, each item in a page has both the possibility to be generated by global functional patterns and by page-specific patterns.

1.3.1.3 The Special Word with Background (SWB) Model

The SWB model further extends the SW model by introducing the concept of "corpus-background-word". The assumption here is, in a website, there could be some general patterns which exist as backgrounds in most pages. For example, in a commercial website, the same headers and footers are often shared on almost every page in the site. The SWB model adds a global common pattern Ω, and the binary switch x is replaced by a ternary switch x(x∈{0,1,2}). Accordingly, as shown in the embodiment depicted in FIG. 7, the representation is the same as the SW model shown in FIG. 6, with the following addition. If $x_i$=2, an item $o_i$ is drawn from Ω (node 700), i.e., $o_i$~Mult(Ω) where Ω~Dir ($\beta^B$) and $\beta^B$ (node 702) is the hyper-parameter controlling the distribution of Ω.

Figure 7:
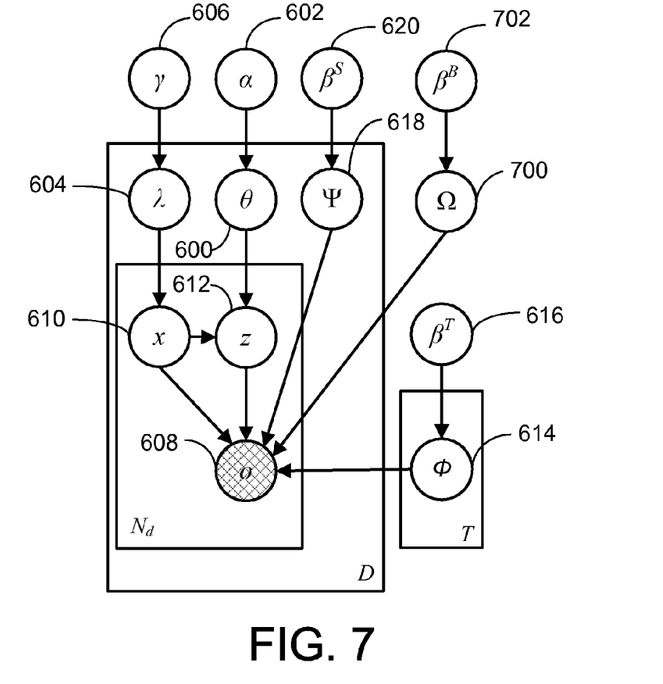
FIG. 7 is a diagram depicting a SWB probabilistic graphical modeling approach.

In the SWB model, the conditional probability of an observation item $o_i$ given a page d can be written as:

$$p(o_i \mid d) = p(x=0 \mid d) \sum_{t=1}^{T} p(o_i \mid z_i = t) p(z_i = t \mid d) + \qquad (3)$$
$$p(x=1 \mid d) p'(o_i \mid d) + p(x=2 \mid d) p''(o_i)$$

where $p''(o_i) = \Omega_{o_i}$. In this way, each item in a page has the possibility to be generated by global functional patterns, by page-specific patterns, and by a common pattern.

1.3.2 Coupled Models for Layout and URL Patterns

Although the single models can learn patterns for either layouts or URLs, the discovered layout patterns and URL patterns are independent with respect to each others as they are generated using different models. However, when designers design a page, they usually think about the patterns in layouts and URLs at the same time. In other words, the layouts and URLs are often coupled with each other. Consequently, design patterns may also be coupled, i.e., layout patterns and URL patterns are correlated with each other. In the following sections, the three previously-described single models will be extended to three coupled models—namely coupled-LDA, coupled-SW, and coupled-SWB.

1.3.2.1 Coupled-LDA

Figure 8:
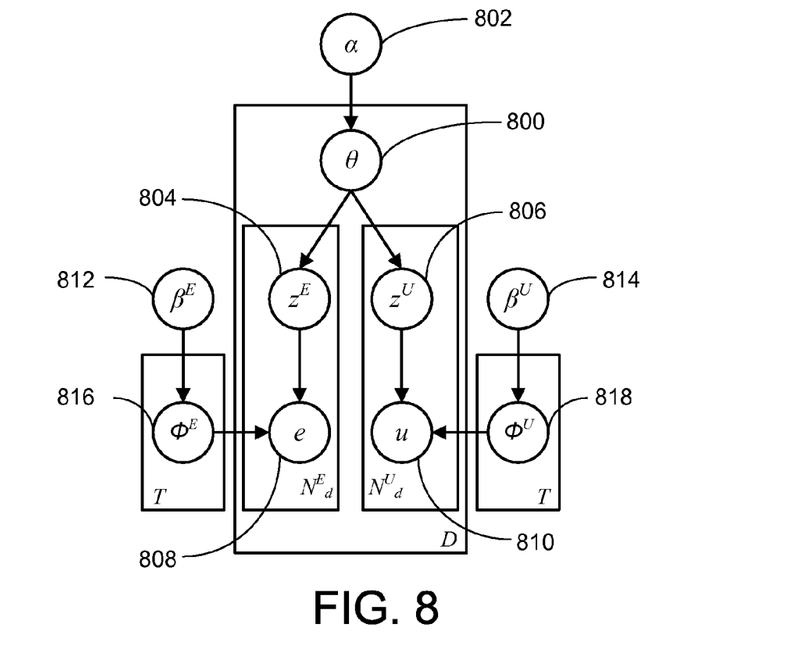
FIG. 8 is a diagram depicting a coupled LDA probabilistic graphical modeling approach.

One embodiment of a probabilistic graphical representation of the coupled-LDA model is shown in FIG. 8. In coupled-LDA, each page d consists of a collection of $N_d^E$ layout elements and $N_d^U$ URL tokens $\{e_i, 1 \leq i \leq N_d^E$ and $u_j, 1 \leq j \leq N_d^U\}$. When generating a page d, it is assumed a mixture of patterns θ (node 800) are drawn from a Dirichlet distribution with parameter α: θ~Dir(α) (node 802), and that the layout pattern $z^E$ (node 804) and the URL pattern $z^U$ (node 806) are drawn from the same prior θ. Given the graphical structure shown in FIG. 8, as the Dirichlet priors are conjugate to the multinomial distributions, $z_i^E$ and $z_j^U$ can be sampled with a collapsed Gibbs sampling. The equations are derived as follows:

$$p(z_i^E = t \mid z_{-i}^E, e_i = e, e_{-i}, z^U, u) \propto \qquad (4)$$
$$\frac{n_{td,-i}^{ETD} + n_{td}^{UTD} + \alpha_t}{\sum_{t'=1}^{T} (n_{t'd,-i}^{ETD} + n_{t'd}^{UTD} + \alpha_{t'})} \times \frac{n_{et,-i}^{ET} + \beta_e^E}{\sum_{e'=1}^{V_e} (n_{e't,-i}^{ET} + \beta_{e'}^E)}$$

$$p(z_j^U = t \mid z_{-j}^U, u_j = u, u_{-j}, z^E, e) \propto \qquad (5)$$
$$\frac{n_{td}^{ETD} + n_{td,-j}^{UTD} + \alpha_t}{\sum_{t'=1}^{T} (n_{t'd}^{ETD} + n_{t'd,-j}^{UTD} + \alpha_{t'})} \times \frac{n_{ut,-j}^{UT} + \beta_u^U}{\sum_{u'=1}^{V_u} (n_{u't,-j}^{UT} + \beta_{u'}^U)}$$

where $n_{td}^{ETD}$ and $n_{td}^{UTD}$ are respectively the numbers of layout elements and URL tokens from page d assigned to pattern t; $n_{et}^{ET}$ and $n_{ut}^{UT}$ are respectively the total numbers of times layout element e (node 808) and URL token u (node 810) were assigned to pattern t in all the pages in a training set; −i and −j in the subscripts indicates the count to element $e_i$ or token $u_j$ is removed from the corresponding numbers; and $\beta^E$ (node 812) is the hyper-parameter controlling the distribution of $\phi^E$ and $\beta^U$ (node 814) is the hyper-parameter controlling the distribution of $\phi_U$. In Eq. (4), it should be noted that the first component on the right side of ∝ contains statistics of u, i.e., $n_{td}^{UTD}$. In other words, the sampling of the layout pattern $z_i^E$ is influenced by the URL patterns. And vice versa, in Eq. (5), the sampling of URL pattern $z_j^U$ also depends on the statistics of layout patterns. Therefore, in coupled-LDA, the modeling of layout patterns and URL patterns are coupled and dependent upon each other.

After sampling, a maximum a posteriori (MAP) method can be employed to estimate the pattern mixture θ for each page d, the "pattern-element" distribution $\phi^E$ (node 816), and the "pattern-token" distribution $\phi^U$ (node 818):

$$\theta_t = \frac{n_{td}^{ETD} + n_{td}^{UTD} + \alpha_t}{\sum_{t'=1}^{T} (n_{t'd}^{ETD} + n_{t'd}^{UTD} + \alpha_{t'})} \qquad (6)$$

$$\phi_{t,e}^E = \frac{n_{et}^{ET} + \beta_e^E}{\sum_{e'=1}^{V_e} (n_{e't}^{ET} + \beta_{e'}^E)}; \phi_{t,u}^U = \frac{n_{ut}^{UT} + \beta_u^U}{\sum_{u'=1}^{V_u} (n_{u't}^{UT} + \beta_{u'}^U)}. \qquad (7)$$

In Eq. (6), the value of θ is explicitly determined by both $n_{td}^{ETD}$ and $n_{ud}^{UTD}$, which indicates the learnt patterns in coupled-LDA reflect the correlations of layouts and URLs.

1.3.2.2 Coupled-SW

Figure 9:
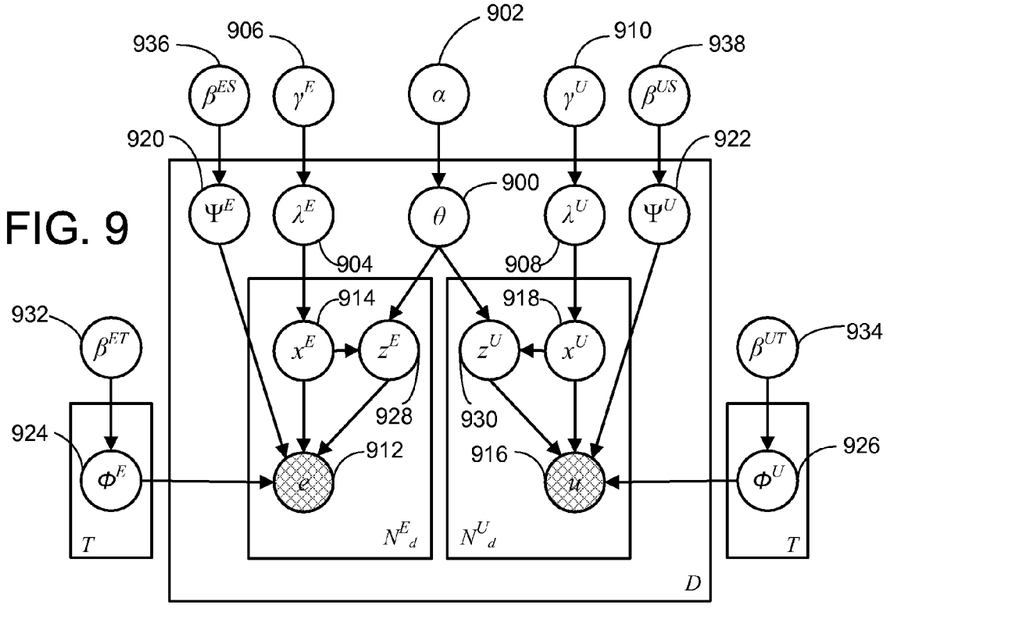
FIG. 9 is a diagram depicting a coupled SW probabilistic graphical modeling approach.

One embodiment of a probabilistic graphical representation of the coupled-SW model is shown in FIG. 9. The coupled-SW model combines two SW models in a similar way to coupled-LDA. Therefore, it has the advantages of both coupled-LDA and SW models. It simultaneously models layout and URL patterns through the same multinomial prior θ

(node 900) (which are drawn from a Dirichlet distribution with parameter α (node 902)). In this case, the mixture of switches $\lambda^E$ (node 904) is drawn from a Dirichlet distribution with parameter $\gamma^E$: $\lambda^E \sim \text{Dir}(\gamma^E)$ (node 906); and the mixture of switches $\lambda^U$ (node 908) is drawn from a Dirichlet distribution with parameter $\gamma^U$: $\lambda^U \sim \text{Dir}(\gamma^U)$ (node 910). For each layout element e (node 912) in d, a switch value $x^E$ (node 914) is drawn from a multinomial distribution with parameter $\lambda^E$. Similarly, for each layout element u (node 916) in d, a switch value $x^U$ (node 918) is drawn from a multinomial distribution with parameter $\lambda^U$. In addition, the page specific layout pattern $\Psi^E$ (node 920) and the page-specific URL pattern $\Psi^U$ (node 922) absorb those local characteristics on individual pages that could otherwise be a source of noise in modeling the functional patterns $\phi^E$ (node 924) and $\phi^U$ (node 926).

Collapsed Gibbs sampling is again utilized to jointly sample $z_i^E$ (node 928) and $x_i^E$ for each element $e_i$; and to jointly sample $z_j^U$ (node 930) and $x_j^U$ for each element $u_j$. For $x_i^E=0$ and $x_j^U=0$, the derived equations are respectively, $$p(x_i^E = 0, z_i^E = t \mid x_{-i}^E, z_{-i}^E, e_i = e, e_{-i}, z^U, u) \propto \qquad (8)$$

$$\frac{\sum_{t'} n_{t'd,-i}^{ETD} + \gamma_0^E}{n_{d,-i}^E + \sum_k \gamma_k^E} \times \frac{n_{td,-i}^{ETD} + n_{td}^{UTD} + \alpha_t}{\sum_{t'}(n_{t'd,-i}^{ETD} + n_{t'd}^{UTD} + \alpha_{t'})} \times \frac{n_{et,-i}^{ET} + \beta_e^{ET}}{\sum_{e'}(n_{e't,-i}^{ET} + \beta_{e'}^{ET})}$$

$$p(x_i^U = 0, z_j^U = t \mid x_{-j}^U, z_{-j}^U, u_i = u, u_{-j}, z^E, e) \propto \qquad (9)$$

$$\frac{\sum_{t'} n_{t'd,-j}^{UTD} + \gamma_0^U}{n_{d,-j}^U + \sum_k \gamma_k^U} \times \frac{n_{td}^{ETD} + n_{td,-j}^{UTD} + \alpha_t}{\sum_{t'}^{T}(n_{t'd}^{ETD} + n_{t'd,-j}^{UTD} + \alpha_{t'})} \times \frac{n_{ut,-j}^{UT} + \beta_u^{UT}}{\sum_{u'}^{V_u}(n_{u't,-j}^{UT} + \beta_{u'}^{UT})}$$

and for $x_i^E=1$ and $x_j^U=1$, the derived equations are respectively, $$p(x_i^E = 1 \mid x_{-i}^E, z_{-i}^E, e_i = e, e_{-i}) \propto \frac{\sum_{e'} n_{e'd,-i}^{ESD} + \gamma_1^E}{n_{d,-i}^E + \sum_k \gamma_k^E} \times \frac{n_{ed,-i}^{ESD} + \beta_e^{ES}}{\sum_{e'}(n_{e'd,-i}^{ESD} + \beta_{e'}^{ES})} \qquad (10)$$

$$p(x_j^U = 1 \mid x_{-j}^U, z_{-j}^U, u_j = u, u_{-j}) \propto \qquad (11)$$

$$\frac{\sum_{u'} n_{u'd,-j}^{USD} + \gamma_1^U}{n_{d,-j}^U + \sum_k \gamma_k^U} \times \frac{n_{ud,-j}^{USD} + \beta_u^{US}}{\sum_{u'}(n_{u'd,-j}^{USD} + \beta_{u'}^{US})}$$

In Eqs. (8)-(11), $n_{ed}^{ESD}$ and $n_{ud}^{USD}$ are the numbers of times layout element e and URL token u are assigned as page-specific items in page d, respectively. Similar to Eqs. (4) and (5), in Eqs. (8) and (9) the sampling of $z_i^E$ and $z_j^U$ are also based on the statistics from both layout elements and URL tokens, so as to keep the correlations of layouts and URLs in the modeling. In addition, in Eqs. (8)-(11), $\beta^{ET}$ (node 932) is the hyper-parameter controlling the distribution of $\phi^E$, $\beta^{UT}$ (node 934) is the hyper-parameter controlling the distribution of $\phi^U$, $\beta^{ES}$ (node 936) is the hyper-parameter controlling the distribution of $\Psi^E$ and $\beta^{US}$ (node 938) is the hyper-parameter controlling the distribution of $\Psi^U$.

After sampling, for each page d, the page-specific patterns of either layouts ($\Psi^E$) or URLs ($\Psi^U$) can be estimated, as:

$$\psi_e^E = \frac{n_{ed}^{ESD} + \beta_e^{ES}}{\sum_{e'}(n_{e'd}^{ESD} + \beta_{e'}^{ES})}; \psi_u^U = \frac{n_{ud}^{USD} + \beta_u^{US}}{\sum_{u'}(n_{u'd}^{USD} + \beta_{u'}^{US})} \qquad (12)$$

1.3.2.3 Coupled-SWB

Figure 10:
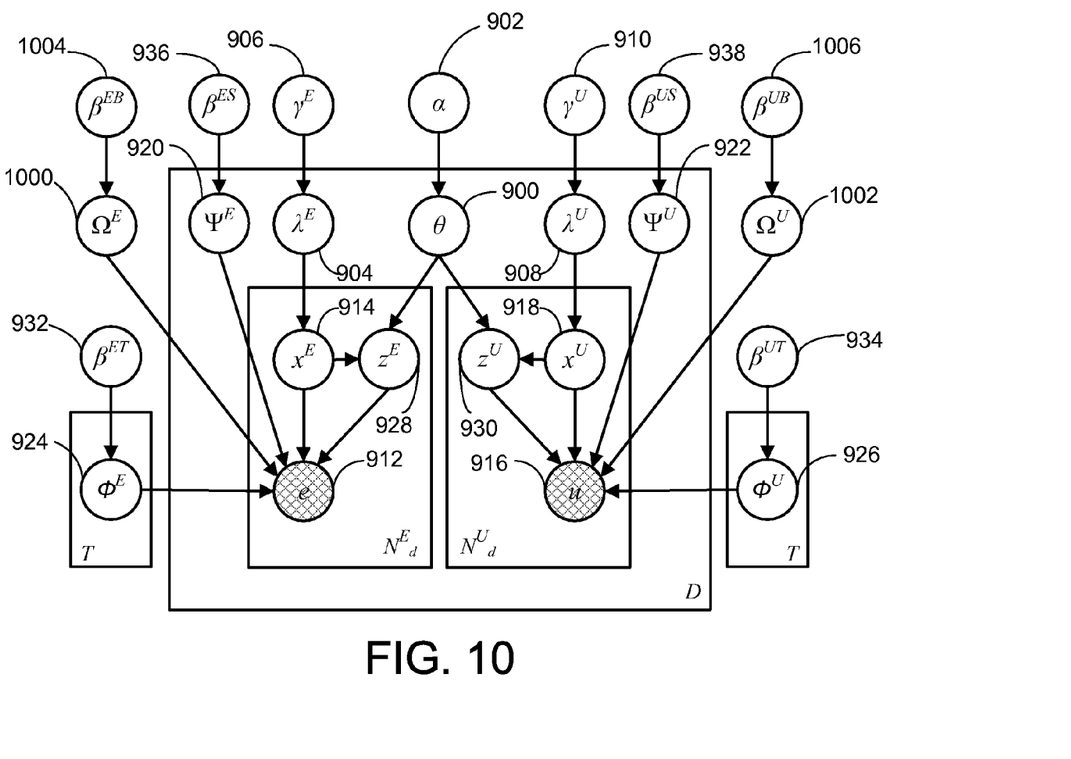
FIG. 10 is a diagram depicting a coupled SWB probabilistic graphical modeling approach.

One embodiment of a probabilistic graphical representation of the coupled-SWB model is shown in FIG. 10. The coupled-SWB model is the same as the just-described coupled-SW model, except the coupled-SWB adds two common background patterns, $\Omega^E$ (node 1000) for layouts and $\Omega^U$ (node 1002) for URLs, to model the site-level background characteristics.

Collapsed Gibbs sampling is again utilized. The sampling equations of coupled-SWB are the same with those of coupled-SW, with the addition of two equations directed to the situation where $x_i^E=2$ and $x_j^U=2$, as shown respectively in:

$$p(x_i^E = 2 \mid x_{-i}^E, z_{-i}^E, e_i = e, e_{-i}) \propto \frac{\sum_{e'} n_{e'd,-i}^{EBD} + \gamma_2^E}{n_{d,-i}^E + \sum_k \gamma_k^E} \times \frac{n_{e,-i}^{EB} + \beta_e^{EB}}{\sum_{e'}(n_{e',-i}^{EB} + \beta_{e'}^{EB})} \qquad (13)$$

$$p(x_j^U = 2 \mid x_{-j}^U, z_{-j}^U, u_j = u, u_{-j}) \propto \qquad (14)$$

$$\frac{\sum_{u'} n_{u'd,-j}^{UBD} + \gamma_2^U}{n_{d,-j}^U + \sum_k \gamma_k^U} \times \frac{n_{u,-j}^{UB} + \beta_u^{UB}}{\sum_{u'}(n_{u',-j}^{UB} + \beta_{u'}^{UB})}$$

where $\beta^{EB}$ (node 1004) is the hyper-parameter controlling the distribution of $\Omega^E$ and $\beta^{UB}$ (node 1006) is the hyper-parameter controlling the distribution of $\Omega^U$.

In Eqs. (13) and (14), $n_e^{EB}$ and $n_u^{UB}$ are the total numbers of times layout element e and URL token u are assigned as common-background items in the pages of the website.

The common background patterns of layouts ($\Omega^E$) and URLs ($\Omega^U$) can be estimated after sampling, as:

$$\Omega_e^E = \frac{n_e^{EB} + \beta_e^{EB}}{\sum_{e'}(n_{e'}^{EB} + \beta_{e'}^{EB})}; \Omega_u^U = \frac{n_u^{UB} + \beta_u^{UB}}{\sum_{u'}(n_{u'}^{UB} + \beta_{u'}^{UB})} \qquad (15)$$

1.4 Distinguishing Website Design Pattern Roles

The models presented in the foregoing sections progressively add branches to identify patterns based on their role in the website. More particularly, as previously described the LDA models finds global functional patterns in the website. The global functional patterns are patterns providing key functions to a group of website pages. The SW models find and distinguish between functional patterns and page-specific patterns. The page-specific patterns are specific patterns only serving one or a few individual website pages. The SWB models find and distinguish between functional patterns, page-specific patterns and common background patterns. The common background patterns are those patterns shared as backgrounds through the whole website.

Thus, depending on the application, the SW and SWB models can not only model website design patterns in general, but roles of the discovered patterns. In the case of the SW models, if it can be determined whether the pattern is most likely a global functional pattern or a page-specific pattern. In the case of the SWB models, it can be determined whether the pattern is most likely a global functional pattern, a page-specific pattern or a common background pattern.

1.5 A Comprehensive Modeling Framework

All the models presented in the foregoing sections can be implemented with one framework. The coupled-SWB model is the most complete model for design pattern analysis; and the other models can be created through customizing the coupled-SWB. For example, the branches of "$\beta^{EB} \rightarrow \Omega^E \rightarrow e$" and "$\beta^{UB} \rightarrow \Omega^U \rightarrow u$" can be turned off in the coupled-SWB model (see FIG. 10) to realize the coupled-SW model (see FIG. 9). Likewise, the branches of "$\beta^{ES} \rightarrow \Psi^E \rightarrow e$", "$\beta^{US} \rightarrow \Psi^U \rightarrow u$", "$\gamma^E \rightarrow \lambda^E \rightarrow x^E \rightarrow e$" and "$\gamma^U \rightarrow \lambda^U \rightarrow x^U \rightarrow u$" can be turned off in the coupled-SW model (see FIG. 9) to realize the coupled-LDA model (see FIG. 8). Still further, either the observation of e or u can be turned off in any of the coupled models to realize a single model version. For example, the observation of u can be turned off in the coupled-SW model (see FIG. 9) to realize the single SW model for layout patterns (see FIG. 6).

Therefore, in implementation it is possible to employ the coupled-SWB model and include functional switches to turn on/off different observations, and to turn on/off the branches dedicated to page-specific patterns and common background patterns. In this way, the extent of the website design pattern modeling can be tailored to the application.

2.0 The Computing Environment

A brief, general description of a suitable computing environment in which portions of the website design pattern modeling technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 11:
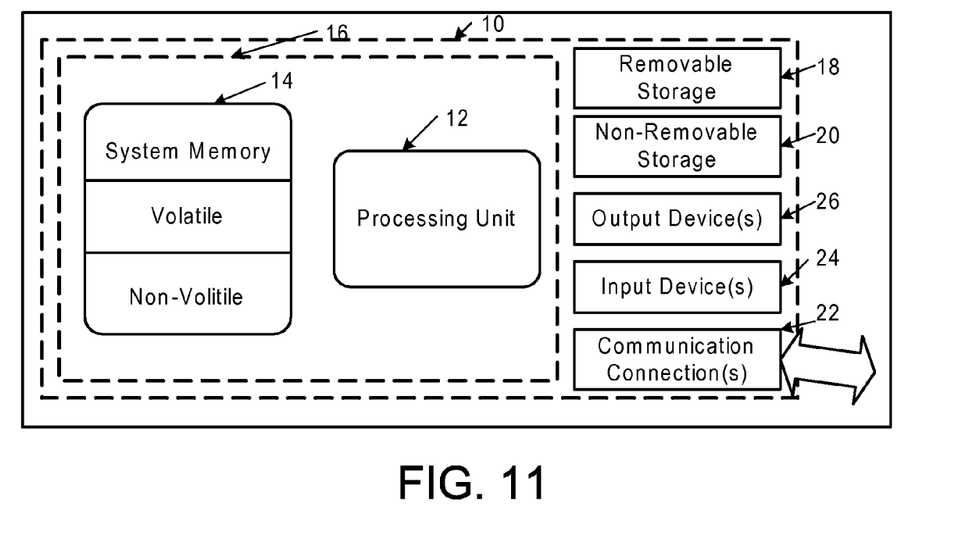
FIG. 11 is a diagram depicting a general purpose computing device constituting an exemplary system for implementing the website design pattern modeling technique embodiments described herein.

FIG. 11 illustrates an example of a suitable computing system environment. The computing system environment is only one example of a suitable computing environment and is not intended to suggest any limitation as to the scope of use or functionality of website design pattern modeling technique embodiments described herein. Neither should the computing environment be interpreted as having any dependency or requirement relating to any one or combination of components illustrated in the exemplary operating environment. With reference to FIG. 11, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 11 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 11 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The website design pattern modeling technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for modeling a multi-page website's design patterns, comprising:
    using a computer to perform the following process actions,
    selecting at least some of the pages of the website,
    for each of the selected pages,
        identifying layout elements found on the selected page, wherein a layout element comprises a combination of a hypertext markup language (HTML) element tag name and its location on the selected page,
        adding the identified layout elements to a layout element vocabulary list, and
    modeling the website design patterns based on the occurrences of layout elements in pages of the website that are listed in the layout element vocabulary list using a modeling technique that at least identifies global functional patterns of the website, wherein a global functional pattern identifies a function of a group of website pages.

2. The process of claim 1, wherein the process action of modeling the website design patterns based on the occurrences of layout elements, comprises an action of modeling the website design patterns using a Latent Dirichlet Allocation (LDA) modeling technique to identify global functional patterns of the website.

3. The process of claim 1, wherein the process action of modeling the website design patterns based on the occurrences of layout elements, comprises an action of modeling the website design patterns using a Special Word (SW) modeling technique.

4. The process of claim 3, wherein the process action of modeling the website design patterns using the SW modeling technique, comprises an action of identifying both global functional patterns and page-specific patterns of the website.

5. The process of claim 1, wherein the process action of modeling the website design patterns based on the occurrences of layout elements, comprises an action of modeling the website design patterns using a Special Word with Background (SWB) modeling technique.

6. The process of claim 5, wherein the process action of modeling the website design patterns using the SWB modeling technique, comprises an action of identifying global functional patterns, page-specific patterns and common background patterns of the website.

7. The process of claim 1, further comprising the process actions of:
  for each of the selected pages,
    identifying uniform resource locator (URL) tokens found on the selected page, wherein a URL token comprises a combination of a substring of a URL and its position in the overall URL string,
    adding the identified URL tokens to a URL tokens vocabulary list; and
  modeling the website design patterns based on the occurrences of URL tokens in pages of the website that are listed in the URL tokens vocabulary list.

8. The process of claim 7, wherein the process action of modeling the website design patterns based on the occurrences of URL tokens, comprises an action of modeling the website design patterns using a Latent Dirichlet Allocation (LDA) modeling technique to identify global functional patterns of the website.

9. The process of claim 7, wherein the process action of modeling the website design patterns based on the occurrences of URL tokens, comprises an action of modeling the website design patterns using a Special Word (SW) modeling technique.

10. The process of claim 9, wherein the process action of modeling the website design patterns using the SW modeling technique, comprises an action of identifying both global functional patterns and page-specific patterns of the website.

11. The process of claim 7, wherein the process action of modeling the website design patterns based on the occurrences of URL tokens, comprises an action of modeling the website design patterns using a Special Word with Background (SWB) modeling technique.

12. The process of claim 11, wherein the process action of modeling the website design patterns using the SWB modeling technique, comprises an action of identifying global functional patterns, page-specific patterns and common background patterns of the website.

13. A system for modeling a multi-page website's design patterns, comprising:
  a general purpose computing device; and
  a computer program comprising program modules executable by the computing device, wherein the computing device is directed by the program modules of the computer program to,
  select at least some of the pages of the website,
  for each of the selected pages,
    identify layout elements found on the selected page,
    add the identified layout elements to a layout element vocabulary list,
    identify URL tokens found on the selected page,
    add the identified URL tokens to a URL token vocabulary list, and
  modeling the website design patterns based on the occurrences of layout elements and URL tokens in pages of the website that are listed in the layout element and URL token vocabulary lists, wherein the modeling is accomplished using a coupled modeling technique that exploits the correlations between the layout elements and URL tokens.

14. The system of claim 13, wherein the program module for modeling the website design patterns based on the occurrences of layout elements and URL tokens, comprises a sub-module for modeling the website design patterns using a coupled Latent Dirichlet Allocation (LDA) modeling technique to identify global functional patterns of the website.

15. The system of claim 13, wherein the program module for modeling the website design patterns based on the occurrences of layout elements and URL tokens, comprises a sub-module for modeling the website design patterns using a coupled Special Word (SW) modeling technique.

16. The system of claim 15, wherein the sub-module for modeling the website design patterns using the coupled SW modeling technique, comprises a sub-module for identifying both global functional patterns and page-specific patterns of the website.

17. The system of claim 13, wherein the program module for modeling the website design patterns based on the occurrences of layout elements and URL tokens, comprises a sub-module for modeling the website design patterns using a coupled Special Word with Background (SWB) modeling technique.

18. The system of claim 17, wherein the sub-module for modeling the website design patterns using the coupled SWB modeling technique, comprises a sub-module for identifying global functional patterns, page-specific patterns and common background patterns of the website.

\* \* \* \* \*